United States Patent [19]
Mancuso et al.

[11] Patent Number: 5,999,231
[45] Date of Patent: Dec. 7, 1999

[54] PROCESSING DEVICE FOR VIDEO SIGNALS

[75] Inventors: Massimo Mancuso, Monza; Rinaldo Poluzzi, Milan, both of Italy

[73] Assignee: STMicroelectronics S.r.l., Agrate Brianza, Italy

[21] Appl. No.: 08/811,117

[22] Filed: Mar. 3, 1997

[30] Foreign Application Priority Data

Mar. 7, 1996 [EP] European Pat. Off. .............. 96830099

[51] Int. Cl.⁶ ........................... H04N 15/21; H04N 9/64; G06K 9/40
[52] U.S. Cl. ......................... 348/720; 348/607; 382/260; 382/275
[58] Field of Search ....................... 364/722.011, 724.01; 348/607, 720; 382/260, 205, 275, 156, 208, 186

[56] References Cited

U.S. PATENT DOCUMENTS

| | | | |
|---|---|---|---|
| 4,797,806 | 1/1989 | Krich | 382/303 |
| 5,245,445 | 9/1993 | Fujisawa | 358/458 |

(List continued on next page.)

FOREIGN PATENT DOCUMENTS

| | | |
|---|---|---|
| 0415648A3 | 3/1991 | European Pat. Off. . |
| 0 680 224 | 11/1995 | European Pat. Off. . |
| 0 698 990 | 2/1996 | European Pat. Off. . |
| 0710001A1 | 5/1996 | European Pat. Off. . |
| 0415648B1 | 5/1998 | European Pat. Off. . |
| 5-226971 | 9/1993 | Japan . |

OTHER PUBLICATIONS

Derwent, Digital Image Signal Filter For Video Appts, Derwent 1995–195757.
Derwent, Automatic Image Quality Compensation in Video System, Derwent 1993–236114.
Derwent, Filter Architecture for High Resolution Video Application, Derwent 1995–368290.
Derwent, Video Image Filter Device, Derwent 1996–173448.
Derwent, Filter for Video Equipment, Derwent 1995–294485.
Derwent, Fuzzy Logic Type Filter for Video Image Noise Reduction, Derwent 1996–211461.

*Primary Examiner*—Michael H. Lee
*Assistant Examiner*—Linus H. Lo
*Attorney, Agent, or Firm*—Seed and Berry LLP; David V. Carlson

[57] ABSTRACT

A processing device for video signals has a memory device suitable to store discrete image elements of a video field and a filtering device supplied by the memory device and suitable to recover errors introduced by the memory device. The filtering device includes a filter, noise detector means, and soft-switch means. The filter has an input supplied with digital signals representative of values of a plurality of discrete image elements and comprises an image element to be examined and neighboring image elements. The discrete image elements is stored in the memory device, and an output supplying digital signals representative of a filtered value of the image element to be examined. The noise detector means operating on fuzzy-logic rules has an input supplied with the digital signals representative of the plurality of values of the image elements and an output supplying a weight signal representative of a degree of erroneousness of the discrete image element to be examined. The noise detector circuit determines the degree of erroneousness by comparing the value of the image element to be examined with the values of the neighboring image elements. The soft-switch means has a first, second and third input and an output. The first input is supplied with the digital signals representative of the value of the image element to be examined. The second input is supplied with the output of the filter. The third input is supplied with the weight signal. The output supplies digital signals representative of a weighted average of the output of the filter and of the digital signals representative of the value of the image element to be examined according to respective weights determined by the degree of erroneousness.

18 Claims, 2 Drawing Sheets

U.S. PATENT DOCUMENTS

| | | | |
|---|---|---|---|
| 5,442,462 | 8/1995 | Guissin | 358/463 |
| 5,544,256 | 8/1996 | Brecher et al. | 382/149 |
| 5,606,646 | 2/1997 | Khan et al. | 706/2 |
| 5,621,474 | 4/1997 | Mancuso et al. | 348/606 |
| 5,659,370 | 8/1997 | Mancuso et al. | 348/620 |
| 5,680,179 | 10/1997 | D'Alto et al. | 348/607 |
| 5,748,796 | 5/1998 | Pennino et al. | 382/254 |
| 5,757,977 | 5/1998 | Mancuso et al. | 382/260 |
| 5,799,111 | 8/1998 | Guissin | 382/254 |
| 5,815,198 | 9/1998 | Vachtsevanos et al. | 348/88 |

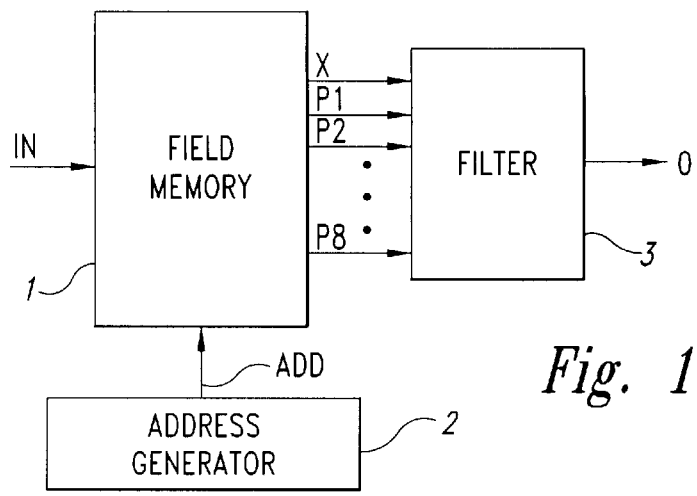
Fig. 1
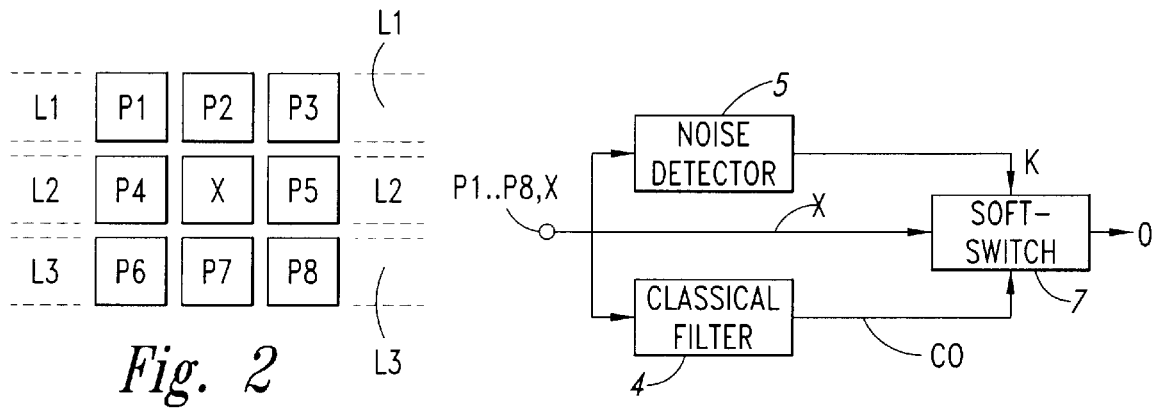
Fig. 2
Fig. 3
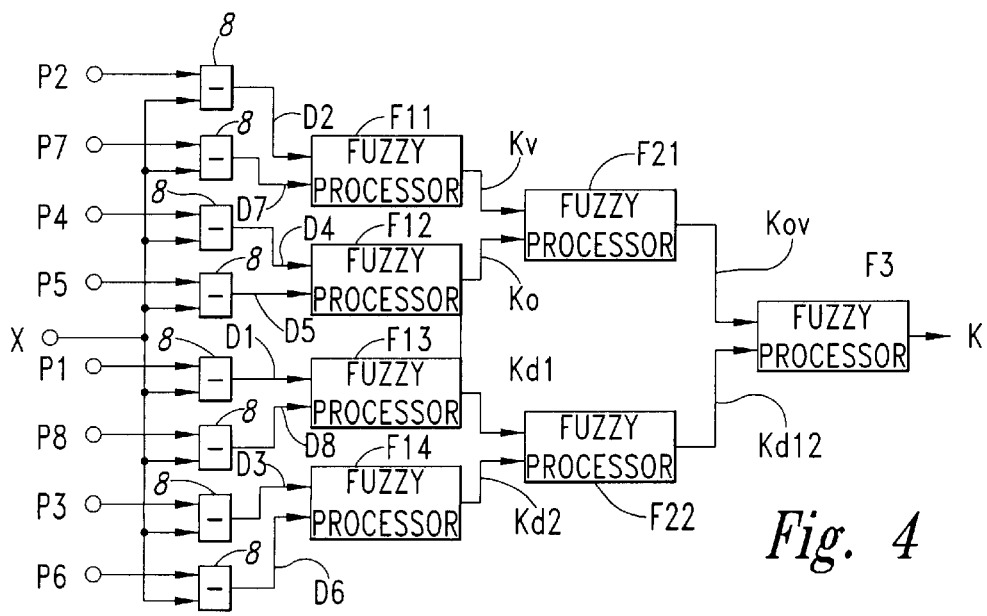
Fig. 4

PROCESSING DEVICE FOR VIDEO SIGNALS

TECHNICAL FIELD

The present invention relates to the field of Digital Signal Processing (DSP) circuits used in video applications.

BACKGROUND OF THE INVENTION

DSP techniques are increasingly used in video applications, and particularly in television (TV) systems, because they allow the quality of the video signal to be enhanced without the need to change the current transmission standard.

Based on such techniques, a number of integrated devices are nowadays available which allow one to add to a normal TV appliance several features, for example line and field frequency doubling, noise reduction, brightness enhancement, and so on. A TV appliance equipped with such devices is referred to as an "Improved Quality TV" (IQTV).

As known, the video signal has a three-dimensional structure, having two spatial dimensions (horizontal and vertical) and a temporal dimension that conveys motion or scene change informations.

IQTV circuits acting on all three dimensions of the video signal, for example filters for scanning rate conversion, such as line frequency or field frequency doubling, require some kind of memory device. Generally, these memory devices are known under the name of field memories, due to the fact that they are capable of storing the image data related to one video field, e.g., 720*288*8 bits for the luminance signal and 360*288*2*8 bits for the chrominance signal, assuming that a 4:2:2 sampling format is adopted.

If, due to some failure in the manufacturing process, some memory cells of the field memory do not work properly, noise is added to the image. In fact, one or more pixels could be wrong and an outline would be visible in the image at the output of the field memory. Depending on the position of the defective memory cell, noise configurations like impulsive noise or salt-and-pepper noise are obtained. This kind of artifact is very annoying because the wrong pixels are always in the same position of the TV screen, causing a sort of dirty window effect. As a consequence, a field memory containing even a single defective memory cell is useless and must be discarded.

This problem is exacerbated by the fact that, thanks to the progress in integrated circuit technologies, future field memories will be only a part of a more complex integrated circuit, so that the presence of defective memory cells in the field memory will cause the refusal of the whole integrated device, with a great impact on the yield of the manufacturing process.

As known, particular error-correction coding strategies have already been developed, such as Cyclic Redundancy Check (CRC), polynomial codes and so on, but all these techniques require extra memory bits in addition to those necessary to store the video signal information. The overhead caused by the additional memory bits negatively affects the overall yield.

SUMMARY OF THE INVENTION

In view of the state of the art described, it is an object of the present invention to provide a processing device for video signals which allows recovery of field memory errors without the need for adding extra memory bits to the field memory, thus allowing an increase in the manufacturing process yield.

According to an embodiment of the present invention, such object is attained by means of a processing device having a memory device suitable to store discrete image elements of a video field, and a filtering device supplied by the memory device and suitable to recover errors introduced by the memory device. The filtering device includes a filter circuit, noise detector means, and soft-switch means.

The filter input is supplied with digital signals representative of values of a plurality of discrete image elements comprising an image element to be examined and neighboring image elements. The discrete image elements are stored in the memory device. The filter output supplies digital signals representative of a filtered value of the image element to be examined.

The noise detector means operates on fuzzy-logic rules having an input supplied with the digital signals representative of the plurality of values of the image elements and an output supplying a weight signal representative of a degree of erroneousness of the discrete image element to be examined. The noise detector means determines the degree of erroneousness by comparing the value of the image element to be examined with the values of the neighboring image elements.

The soft-switch means includes a first input supplied with the digital signals representative of the value of the image element to be examined, a second input supplied with the output of the filter, a third input supplied with the weight signal, and an output. The output supplies digital signals representative of a weighted average of the output of the filter and of the digital signals representative of the value of the image element to be examined according to respective weights determined by said degree of erroneousness.

The processing device according to the present invention comprises a decision-directed filter, because the filtering action on an image element under examination is performed only when it is recognized that such an image element is erroneous. With the provision of noise detector means operating on fuzzy-logic rules, the degree to which the value of the image element under examination is corrected by an interpolated (filtered) value, depending on the degree to which said image element under examination is recognized to be erroneous. A smooth filtering action is thus achieved which guarantees that the processed image is highly faithful to the original one, i.e., the filtering device of the present invention does not deteriorate the quality of a received image.

With the processing device of the present invention, it is possible to recover errors introduced by the field memories containing defective memory cells. This allows an increase in the yield of the manufacturing processes of field memories.

BRIEF DESCRIPTION OF THE DRAWINGS

These and other features and advantages of the present invention will be made more apparent by the following detailed description of some particular embodiments, described as non-limiting examples in the annexed drawings.

FIG. 1 is a schematic block diagram showing a field memory and a filtering device for recovering errors in the field memory according to the present invention.

FIG. 2 shows a window of neighboring pixels used by the filtering device of the present invention to detect and recover errors in the field memory.

FIG. 3 is a schematic block diagram of the filtering device of FIG. 1.

FIG. 4 is a schematic block diagram of a noise detector circuit of the filtering device shown in FIG. 3.

DETAILED DESCRIPTION OF THE INVENTION

Figure 5:
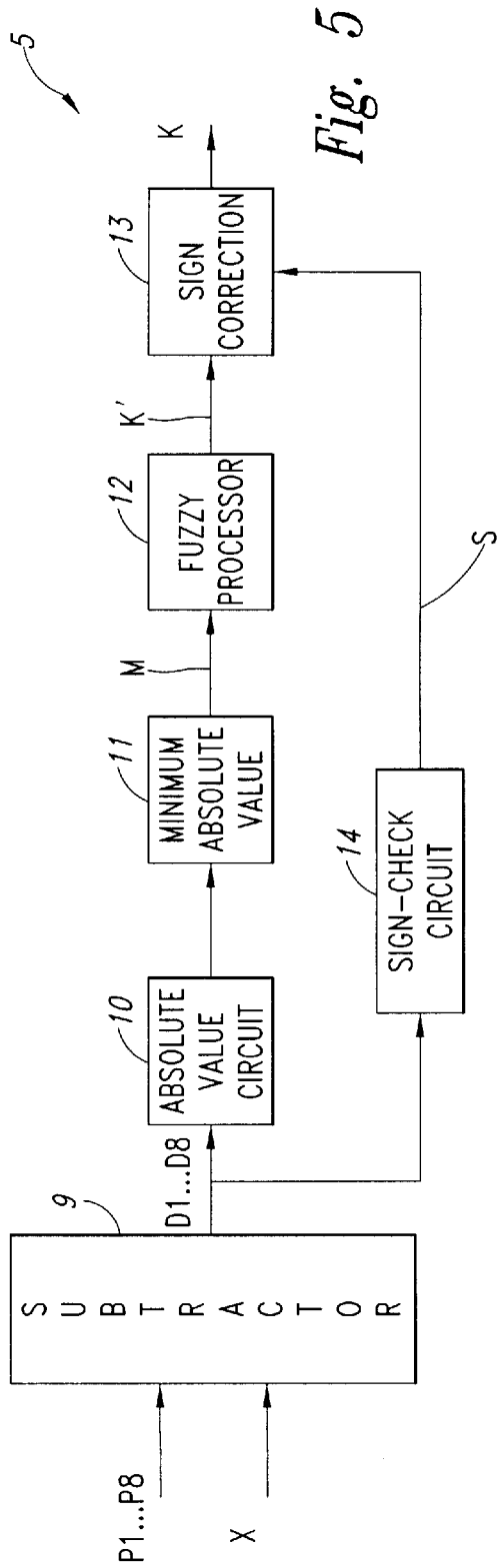
FIG. 5 is a block diagram showing a first practical embodiment of the noise detector circuit shown in FIG. 4.

With reference to the drawings, in FIG. 1 a field memory 1 is shown, generally belonging to an IQTV circuit for video appliances.

Field memory 1 is supplied with digital signals IN, typically eight digital signals globally representative of eight-bit digital codes which represent the values (e.g., gray levels) of discrete image elements (pixels) of a video field. It should be understood that digital signals IN are generated in a known fashion by way of an analog-to-digital converter (not shown) supplied by an analog TV signal, such as the luminance signal (in this case field memory 1 is a 720*288*8 bits memory) or the chrominance signal (in this case field memory 1 is a 360*288*2*8 bits memory, assuming that 4:2:2 sampling format is adopted).

An address generator circuit 2 generates address signals ADD for addressing the field memory 1, to select the memory cells wherein the information carried by the incoming digital signals IN is to be stored.

Field memory 1 supplies nine groups of digital signals X and P1 . . . P8 to a filtering device 3, each group of digital signals comprising in this example eight digital signals. The groups of digital signals X and P1 . . . P8 form a so-called processing window, shown in detail in FIG. 2, comprising groups of three pixels (P1,P2,P3), (P4,X,P5) and (P6,P7,P8) belonging to three consecutive image lines L1, L2 and L3, respectively. X represents the current pixel which has to be examined in order to detect if errors have been introduced by the field memory 1; P1 . . . P8 are neighboring pixels used by the filtering device 3 to ascertain if such errors have been introduced and to correct said errors. Even if in the present example a 3*3 pixels processing window is shown, larger processing windows could obviously be employed. The processing window shifts one pixel at a time along the direction of the lines (from left to right in FIG. 2), so that all the pixels of line L2 can be examined. When all the pixels of a given line have been examined, the processing window is shifted one line down, to examine the pixels of the next line.

FIG. 3 is a schematic block diagram of the filtering device 3 according to the present invention. Filtering device 3 comprises a classical filter 4, such as a linear filter or, preferably, a non-linear filter, for example a so-called median filter, and a noise detection circuit 5. As will be described in greater detail in the following, the noise detection 5 is a fuzzy computation unit operating on fuzzy logic rules. The classical filter 4 and the noise detection circuit 5 are supplied with the groups of digital signals P1 . . . P8 and X representative of the pixels in the current processing window.

On the basis of the values of pixels P1 . . . P8, classical filter 4 calculates an interpolated value for the pixel X according to known algorithms. Classical filter 4 generates an output digital code CO representative of said interpolated value which is supplied to a first input of a soft-switch circuit 7. A median non-linear filter is preferred to a linear filter because the former has better impulsive noise reduction and edge-preserving capabilities; as known, median filters are the most widely used to recover image information without further reducing bandwidth.

The noise detection circuit 5 generates a signal K with a value in the range [0,1], determined in a way which will be explained in detail later on, and the signal K is supplied to a second input of the soft-switch circuit 7.

A third input of the soft-switch circuit 7 is supplied by the group of digital signals X, representative of the value of pixel X in the processing window (i.e., the pixel currently examined). An output digital code O of the soft-switch circuit 7 forms the output of the filtering device 3.

FIG. 4 is a block diagram schematically showing the noise detection circuit 5.

The noise detection circuit 5 comprises eight digital subtraction circuits 8, each one supplied with the group of digital signals X and a respective one of the groups of digital signals P1 . . . P8. Each subtraction circuit 8 generates a respective subtraction signal D1 . . . D8 according to the following table:

| | |
|---|---|
| D1 = X − P1 | D5 = X − P5 |
| D2 = X − P2 | D6 = X − P6 |
| D3 = X − P3 | D7 = X − P7 |
| D4 = X − P4 | D8 = X − P8. |

Subtraction signals D2 and D7 (associated to the vertical direction) are supplied to a first fuzzy line processing circuit F11, subtraction signals D4 and D5 (associated to the horizontal direction) are supplied to a second fuzzy line processing circuit F12, subtraction signals D1 and D8 (associated to a direction slanted −45° with respect to the horizontal direction) are supplied to a third fuzzy line processing circuit F13, and subtraction signals D3 and D6 (associated to a direction slanted 45° with respect to the horizontal direction) are supplied to a fourth fuzzy line processing circuit F14. Fuzzy line processing circuits F11, F12,F13 and F14 form a first level of fuzzy processing.

Fuzzy line processing circuits F11 and F12 have respective fuzzy-valued output signals Kv and Ko which are supplied to a first second-level fuzzy processing circuit F21; fuzzy line processing circuits F13 and F14 have respective fuzzy-valued output signals Kd1 and Kd2 which are supplied to a second second-level fuzzy processing circuit F22. Fuzzy processing circuits F21 and F22 form a second level of fuzzy processing.

Second-level fuzzy processing circuits F21 and F22 have respective fuzzy-valued output signals Kov and Kd12 which are supplied to a third-level fuzzy processing circuit F3, whose output signal is the signal K.

The operation of the filtering device 3 will be now explained.

Address generator 2 generates addresses of three groups of three pixels (P1,P2,P3), (P4,X,P5) and (P6,P7,P8) belonging to three consecutive image lines of the image field, to form the processing window shown in FIG. 2. The data stored in the field memory 1 are supplied to the filtering device 3. The classical filter 4, on the basis of the values of pixels P1 . . . P8, and according to known algorithms (depending on the specific type of filter used), determines an interpolated value for the pixel X; this value, represented by the digital code CO in FIG. 3, is supplied to the soft-switch circuit 7. Simultaneously, the noise detection circuit 5 processes the pixel data to ascertain if pixel X is erroneous or not and if correction is required.

More specifically, each one of the four fuzzy line processing circuits F11 . . . F14 determines the degree to which the value of pixel X can be considered "erroneous" in view of the values of the pixels along the associated direction. This is done by means of an inference mechanism which involves verifying the following fuzzy rules:

IF Di IS HIGH-POSITIVE AND Dn IS HIGH-POSITIVE THEN Km IS HIGH;

IF Di IS HIGH-NEGATIVE AND Dn IS HIGH-NEGATIVE THEN Km IS HIGH;

ELSE Km IS LOW.

for F11: Di = D2, Dn = D7 and Km = Kv;
for F12: Di = D4, Dn = D5 and Km = Ko;
for F13: Di = D1, Dn = D8 and Km = Kd1; and
for F14: Di = D3, Dn = D6 and Km = Kd2.

As known to anyone skilled in the field of fuzzy systems, this involves defining fuzzy sets such as "HIGH-POSITIVE" and "HIGH-NEGATIVE" for the input variables (antecedents) Di, Dn and "HIGH" or "LOW" for the output variable (consequent) Km (the fuzzy sets are sub-sets of the range of values that the input and output variables can take), defining degree-of-membership functions for each fuzzy set, and verifying which fuzzy rules, and with which degree, are verified by the current values of the input variables. The value of Km represents the truth value of the sentence "the value of pixel X is erroneous".

It should be noted that at the first level of processing even if processing in one or more of the four directions detects that, in view of the pixel values in such direction, the value of pixel X is erroneous, this does not mean that the value of pixel X is actually erroneous: for example, if in the image area covered by the processing window a 45° diagonal line is present, processing along the vertical, horizontal and −45° directions detects that X is erroneous (Kv, Ko and Kd1 belong to the fuzzy set "HIGH"), but pixel X is not actually erroneous (and in fact Kd2 belongs to the fuzzy set "LOW"). This is the reason why a decision on the "erroneousness" of pixel X is not taken after the first level of fuzzy processing.

The second-level fuzzy processing circuits F21,F22 implements the following fuzzy rules:

IF Ka IS HIGH AND Kb IS HIGH THEN Kab IS HIGH;

ELSE Kab IS LOW.

wherein for F21, Ka=Kv, Kb=Ko and Kab=Kov, while for F22, Ka=Kd1, Kb=Kd2 and Kab=Kd12.

The third-level fuzzy processing circuit F3 implements the following rule:

IF Kov AND Kd12 IS HIGH THEN K IS HIGH;

ELSE K IS LOW.

It should be noted that while the first fuzzy processing level (F11 . . . F14) is performed on the image domain, which means that the input variables D1 . . . D8 must be preliminarily "fuzzified", the second and third levels of fuzzy processing layers are performed on fuzzy parameters Kv, Ko, Kd1, Kd2, Kov and Kd12.

It should also be noted that the noise detection process performed by the noise detection circuit 5 is isotropic, so that the first and the second levels of fuzzy processing could employ only one fuzzy processing circuit each, provided that a time sharing architecture is designed.

The computed value of K, varying in the range [0,1], corresponds to the degree of "erroneousness" of pixel X. The value K is supplied to the soft-switch circuit 7, which performs a weighted average of the actual value of pixel X and the interpolated value of pixel X determined by the classical filter 4, the weights being determined by the value of K. The output O of soft-switch circuit 7 is given by:

$$O=K*CO+(1-K)*X.$$

O is a digital code representing the value of the pixel X to be shown on the TV screen, or to be used in further processing of the video signal by the IQTV circuits.

The filtering device 3 is decision-directed filter, because filtering is performed only when an erroneous pixel is detected; this guarantees that the processed image is highly faithful to the original one.

The choice of dividing the fuzzy process in a cascade of three levels allows the use of fuzzy processing circuits having only two antecedents each. This will limit the width of the memory devices required to store the output of the fuzzy calculus. It is known that when a fuzzy process is implemented by a look-up table, the larger the number of antecedents, the wider the memory required to store the output of the fuzzy calculus.

FIG. 5 is a block diagram showing a first example of practical embodiment of the noise detection circuit 5.

The circuit comprises a digital subtractor 9 having inputs for receiving the groups of signals P1 . . . P8 and X and generating the eight subtraction signals D1 . . . D8 according to the table given above. The eight subtraction signals D1 . . . D8 are supplied to an absolute-value circuit 10 which computes, for each subtraction signal, its absolute value. The absolute-value circuit 10 supplies a circuit 11 suitable to determine the subtraction signal having the minimum absolute value, i.e., performing the following operation:

$$M=\min(|D1|,|D2|,\ldots,|D8|).$$

The output M of circuit 11 is supplied to a fuzzy processing circuit 12 which "fuzzifies" the input variable M and, on the basis of predetermined fuzzy sets and respective membership functions, determines the value of a signal K' within the range [0,1]. The signal K' is supplied to a sign correction circuit 13, which also receives an output signal S of a sign-check circuit 14 which receives at its inputs the sign bits of the subtraction signals D1 . . . D8 to verify if all the subtraction signals D1 . . . D8 have the same sign: the signal S is a two-levels logic signal indicating if this condition is met or not. If the condition is met, the signal K at the output of the sign correction circuit 13 is made equal to K', otherwise K is forced to zero.

To understand why the circuit of FIG. 5 is an implementation of each fuzzy processing level of the schematic circuit of FIG. 4, it should be observed that the fuzzy rules implemented at each level of the fuzzy processing have the general form:

IF A1 IS HIGH AND A2 IS HIGH THEN Ka IS HIGH;

ELSE Ka IS LOW, wherein A1, A2 and Ka are generic variables expressing, respectively, the antecedents and the consequence of the rule. Mathematically, using the "min" (minimum) operator as an aggregator, and using the conventional centroids method for the defuzzification process, the output of each fuzzy processing is expressed by the following equation:

$$Ka=(\alpha_1 * C_H)/(\alpha_1 + \alpha_{ELSE})$$

wherein:

$$\alpha_1 = \min[f(A1), f(A2)],$$

$$\alpha_{ELSE} = 1 - \alpha_1.$$

f(A1), f(A2) are the membership functions of A1 and A2 to the fuzzy set "HIGH"; $C_H$ is the centroid of the consequent part. Since each parameter Ka can take values in the range [0,1], $C_H=1$, so that:

$$Ka=\alpha_1=\min[f(A1),f(A2)].$$

Assuming that the membership function associated with the fuzzy set "HIGH" is increasing monotonic, it follows that:

$$Ka=f[\min(A1,A2)].$$

Extending this consideration to the cascade of the three levels of fuzzy processing, it is obtained:

$$K'=f[\min(D1,D2,D3,D4,D5,D6,D7,D8)].$$

The fuzzy processing of the first level (F11 . . . F14) requires that all the subtraction signals have the same sign, i.e., in order for the pixel X to be really an erroneous pixel, its value must be the greatest or the lowest among pixels P1 . . . P8. The sign-check circuit 14 and the sign correction circuit 13 allow the circuit 5 to take into account this condition.

Figure 6:
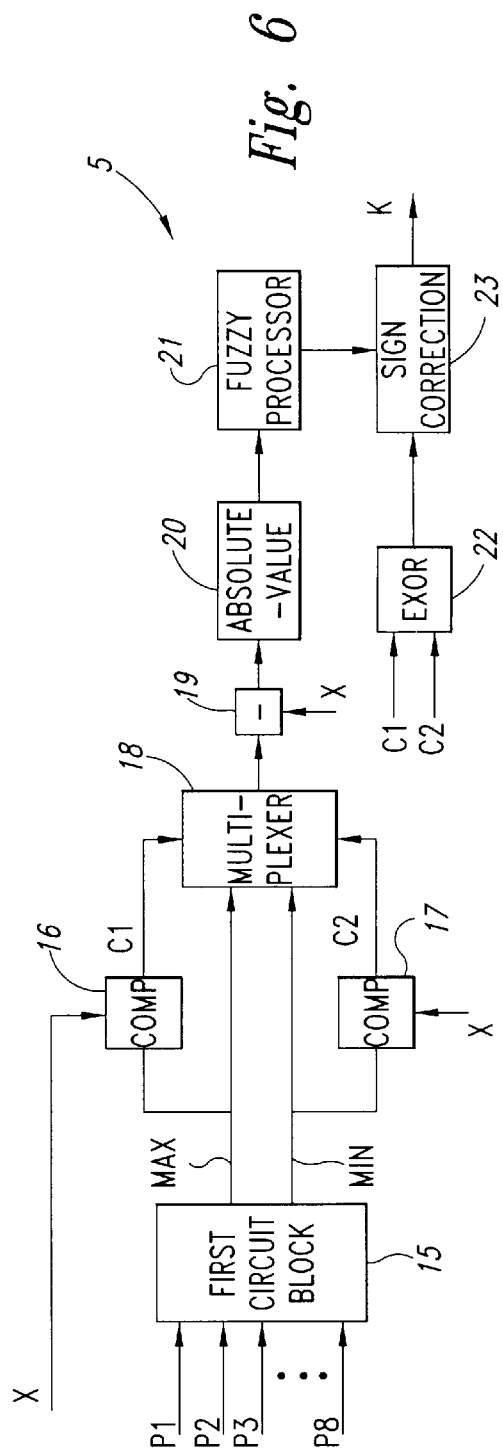
FIG. 6 is a block diagram showing a second, preferred practical embodiment of the noise detector circuit shown in FIG. 4.

FIG. 6 is a block diagram of another, preferred practical embodiment of the noise detector circuit 5 of FIG. 4, shown in circuit 5'.

The circuit 5' comprises a first circuit block 15 supplied with the groups of digital signals P1 . . . P8, and that determines which of these eight pixels have the maximum and minimum values, respectively. Circuit block 15 has a first output signal MAX and a second output signal MIN, respectively representative of the maximum value and minimum value among the values of pixels P1 . . . P8. Signal MAX is supplied to a first digital comparator 16, which is also supplied with the group of digital signals X. Signal MIN is supplied to a second digital comparator 17, which is also supplied with the group of signals X. Signals MAX and MIN are also supplied to a multiplexer 18 controlled by two signals C1 and C2 representing the output of the first and second comparators 16 and 17, respectively. For example, the digital comparators 16 and 17 output an active signal to the multiplexer 18 if the group of signals X is higher or lower than the signals MAX and MIN, respectively.

An output of multiplexer 18 is supplied to a digital subtractor 19 which is also supplied with the group of signals X. An output of digital subtractor 19 is supplied to an absolute-value circuit 20, which in turn supplies a fuzzy processing circuit 21.

The output signals C1 and C2 of the digital comparators 16 and 17 are supplied to an EXOR logic circuit 22. An output of the EXOR circuit 22 is activated if only one of the signals C1, C2 is activated, i.e., the output of EXOR 22 is activated only if the value of pixel X is higher than the maximum value of pixels P1 . . . P8, or if the value of pixel X is lower than the minimum value of pixels P1 . . . P8.

The output of EXOR 22 supplies a sign correction circuit 23 which is also supplied by the output of the fuzzy processing circuit 21. The output K of the sign correction circuit 23 is made equal to the output of the fuzzy processing circuit 21 only if the output of EXOR circuit 22 is activated, otherwise the output signal K is forced to zero.

To understand why the circuit of FIG. 6 is a practical implementation of the circuit schematically shown in FIG. 4, the same considerations made in connection with the circuit of FIG. 5 hold true, and it should be further observed that:

all the subtraction signals D1 . . . D8 have the same sign only if the pixel X has the biggest or smallest value among the pixels in the processing window;

to detect if pixel X has the biggest value, the maximum among the pixels P1 . . . P8 is detected: if X is greater than the pixel P1 . . . P8 with the biggest value, then certainly X will have the biggest value and all the subtraction signals will have the same sign;

if X has the maximum value among the pixels in the processing window, then the subtraction signal with the smallest value is X-MAX;

to detect if the pixel X has the smallest value, the minimum among the pixels P1 . . . P8 is detected: if X is smaller than the pixel P1 . . . P8 with the smallest value, then certainly X will have the smallest value and all the subtraction signals will have the same sign; and if X has the minimum value among the pixels in the processing window, then the subtraction signal with the smallest value is X-MIN.

The circuit architecture shown in FIG. 6 is preferred to that shown in FIG. 5 because only one absolute value, instead of eight, must be computed, and the sign check circuit, represented by the EXOR 22, has only two inputs, instead of eight.

It should be observed that the filtering device according to the present invention is capable of recovering erroneous pixels only when one pixel (the central one) out of nine (the pixels in processing window) is wrong. This means that if we consider the address of the field memory as composed by two parts: A=[R,P] where R is the address part related to the row and P the address part related to the pixel position in the row, the filter can correct the error only if the distance between two wrong data is greater than 1 for both R and P. The safe area is given by R-j, P-j with j=0,1.

A possible way to assure that no more than one wrong pixel exists in the processing window is to provide an address generator circuit for the memory device which, taking account of the probability distribution of defects in the memory device, allows storage of the data of adjacent pixels in non-adjacents memory locations.

The filtering device previously described is not limited to recovering of field memory errors, being more generally useful for reducing image noise.

The individual components of the field memory 1 and the address generator circuit 2 are all well known in the art. Similarly, the individual circuits embodying the filtering device 3 can be realized using circuits of the type that are well known in the art, based on the description herein. For example, the classical filter 4, soft-switch circuit 7, digital subtractor 9, absolute-value circuit 10, minimum detecting circuit 11, fuzzy processing circuit 12, sign correction circuit 13, and sign-check circuit 14 can be realized using circuits of the type that are well known in the art, based on the description herein. The present invention is directed toward the combination of these individual components within a new circuit. Any suitable circuits to obtain these individual components are acceptable. A person of skill in the art would be able to use known circuits to provide the requested signals based on the disclosure of the present invention.

We claim:

1. Processing device for video signals, comprising:

a memory device suitable to store discrete image elements of a video field;

a filtering device supplied by said memory device and suitable to recover errors introduced by the memory device, the filtering device comprising:

a filter having an input supplied with digital signals representative of values of a plurality of discrete image elements comprising an image element to be examined and neighboring image elements, said discrete image elements being stored in the memory device, and an output supplying digital signals representative of a filtered value of the image element to be examined;

a noise detector operating on fuzzy-logic rules having an input supplied with said digital signals representative of the plurality of values of the image elements and an output supplying a weight signal representative of a degree of erroneousness of the discrete image element to be examined, the noise detector determining said degree of erroneousness comparing the value of the image element to be examined with the values of the neighboring image elements, the noise detector comprising:

a digital subtraction determiner supplied with said digital signals representative of values of said plurality of image elements and supplying difference digital codes, each one representative of a difference between the value of the image element to be examined and the value of a respective one of the neighboring image elements;

a first determiner configured to determine which of said difference digital codes has the minimum absolute value and generating a minimum digital difference code representative of the difference digital code having the minimum absolute value; and a soft-switch device having a first input supplied with the digital signals representative of the value of the image element to be examined, a second input supplied with the output of the filter, a third input supplied with the weight signal, and an output supplying digital signals representative of a weighted average of the output of the filter and of the digital signals representative of the value of the image element to be examined according to respective weights determined by said degree of erroneousness.

2. Processing device according to claim 1 wherein said weighted average includes a weight of the output of the filter as represented by the weight signal, and a weight of the digital signals representative of the value of the image element to be examined is represented by 1 minus the weight signal.

3. Processing device according to claim 1 wherein said filter is a non-linear filter.

4. Processing device according to claim 3 wherein said filter is a median filter.

5. Processing device according to claim 1 wherein said noise detector means comprises:

a fuzzy processor supplied by said minimum digital difference code and generating a fuzzy-valued signal representative of a degree of deviation of the value of the image element to be examined from the values of the neighboring image elements; and a sign-checker configured to check signs of said difference digital codes and suitable to make said weight signal selectively equal to said fuzzy-valued signal or to a prescribed value representative of the non-erroneousness of the image element to be examined, respectively if all said difference digital codes have the same sign or not.

6. Processing device according to claim 5 wherein said prescribed value is zero.

7. Processing device according to claim 1 wherein said first determiner comprises an absolute-value calculator for calculating absolute values of said difference digital codes and second determiner configured to determine the minimum absolute value.

8. Processing device according to claim 5 wherein said fuzzy processor is configured to evaluate degrees of membership of said minimum absolute value to fuzzy sets of values which can be taken by said minimum absolute value.

9. Processing device for video signals, comprising:

a memory device suitable to store discrete image elements of a video field;

a filtering device supplied by said memory device and suitable to recover errors introduced by the memory device, the filtering device comprising:

a filter having an input supplied with digital signals representative of values of a plurality of discrete image elements comprising an image element to be examined and neighboring image elements, said discrete image elements being stored in the memory device, and an output supplying digital signals representative of a filtered value of the image element to be examined;

a noise detector configured to operate on fuzzy-logic rules having an input supplied with said digital signals representative of the plurality of values of the image elements and an output supplying a weight signal representative of a degree of erroneousness of the discrete image element to be examined, the noise detector determining said degree of erroneousness comparing the value of the image element to be examined with the values of the neighboring image elements, the noise detector comprising:

a first determiner supplied by the digital signals representative of values of the neighboring image elements and having a first output supplying digital signals representative of the maximum value of the neighboring image elements and a second output supplying digital signals representative the minimum value of the neighboring image elements;

a second determiner supplied by said first and second output of the first determiner and by the digital signals representative of the value of the image element to be examined for detecting if the image element to be examined has a value higher than said maximum value or lower than said minimum value and having an output respectively representative of said maximum value or said minimum value;

a digital subtraction determiner supplied by said second determiner and by said digital signals representative of the value of the image element to be examined and having an output representative of an absolute-value difference between the digital signals representative of the value of the image element to be examined and said output of the second means; and a fuzzy processor supplied by the output of said digital subtraction determiner and generating a fuzzy-valued signal representative of a degree of deviation of the value of the image element to be examined from said maximum value or minimum value.

10. Processing device according to claim 9 wherein the noise detector further comprises:

a third determiner configured to making said weight signal equal to said fuzzy-valued signal when the value of the image element to be examined is higher of said maximum value or lower of said minimum value; or for making said weight signal equal to a prescribed value when the value of the image element to be examined is comprised between said minimum value and maximum value, said prescribed value being representative of the non-erroneousness of the image element to be examined.

11. Processing device according to claim 9 wherein said second determiner comprises:

a first digital comparator for comparing the digital signals representative of the value of the image element to be examined with said first output of the first determiner;

a second digital comparator for comparing the digital signals representative of the value of the image element to be examined with said second output of the first means; and a multiplexor supplied by said first and second outputs of the first determiner and controlled by said first and second digital comparators for selectively supplying said digital subtraction determiner with said maximum value if the image element to be examined has a value higher than said maximum value, or with said minimum value if the image element to be examined has a value lower than said minimum value.

12. Processing device according to claim 10 wherein said digital subtraction determiner comprises a digital subtractor and absolute-value calculator for calculating an absolute value of a difference digital code supplied by said digital subtractor.

13. Processing device according to claim 12 wherein said fuzzy processor comprises an evaluator for evaluating degrees of membership of said absolute value to fuzzy sets of values which can be taken by said absolute value.

14. The method of filtering video signals comprising the steps of:

storing a video image comprised of a plurality of pixels;

interpolating a value of a current pixel based on the current pixel and a plurality of surrounding pixels, the current and surrounding pixels being selected from the plurality of pixels;

determining a weighting value of the current pixel based on a degree of erroneousness of the current pixel as compared to the surrounding pixels;

determining a weighted average of the current pixel based on the interpolated value of the current pixel and the determined weighting value;

determining minimum and maximum values from the surrounding pixels;

comparing the minimum and maximum values to the current pixel;

selecting one of the minimum and maximum values based on the step of comparing;

subtracting the selected minimum and maximum value from the current pixel to produce a subtracted value;

applying a predetermined rule to the subtracted value to produce an initial weighted value; and correcting a sign of the initial weighted value.

15. The method of claim 14, further comprising the step of repeatedly performing the steps of interpoating, determining a weighting value and determining a weighted average for each pixel in the plurality of pixels.

16. The method of filtering video signals comprising the steps of:

storing a video image comprised of plurality of pixels;

interpolating a value of a current pixel based on the current pixel and a plurality of surrounding pixels, the current and surrounding pixels being selected from the plurality of pixels;

determining a weighting value of the current pixel based on a degree of erroneousness of the current pixel as compared to the surrounding pixels;

determining a weighted average of the current pixel based on the interpolated value of the current pixel and the determined weighting value;

subtracting each of the surrounding pixels from the current pixel to produce a plurality of difference values;

detecting a minimum value from the difference values;

applying predetermined rules to the minimum value to produce an initial weighting value; and correcting a sing of the initial weighting value.

17. The method of claim 16, further comprising the step of repeatedly performing the steps of interpolating, determining a weighting value and determining a weighted average for each pixel in the plurality of pixels.

18. Processing device according to claim 9 wherein said prescribed value is zero.

* * * * *